(12) United States Patent
Dickmann et al.

(10) Patent No.: US 11,102,592 B2
(45) Date of Patent: Aug. 24, 2021

(54) WIRELESS HEARING DEVICE COMPRISING SPLIT PAIRING TABLES

(71) Applicant: Sonova AG, Staefa (CH)

(72) Inventors: Georg Dickmann, Ebmatingen (CH); Daniel Lucas-Hirtz, Rapperswil (CH)

(73) Assignee: Sonova AG, Staefa (CH)

( * ) Notice: Subject to any disclaimer, the term of this patent is extended or adjusted under 35 U.S.C. 154(b) by 119 days.

(21) Appl. No.: 16/342,556

(22) PCT Filed: Oct. 20, 2016

(86) PCT No.: PCT/EP2016/075208
§ 371 (c)(1),
(2) Date: Apr. 17, 2019

(87) PCT Pub. No.: WO2018/072830
PCT Pub. Date: Apr. 26, 2018

(65) Prior Publication Data
US 2020/0053491 A1  Feb. 13, 2020

(51) Int. Cl.
*H04R 25/00* (2006.01)
*H04W 12/55* (2021.01)

(52) U.S. Cl.
CPC ......... *H04R 25/554* (2013.01); *H04R 25/552* (2013.01); *H04R 2225/023* (2013.01);
(Continued)

(58) Field of Classification Search
CPC ................ H04R 25/554; H04R 25/552; H04R 2225/023; H04R 2225/025; H04R 2225/55; H04W 12/0005
(Continued)

(56) References Cited

U.S. PATENT DOCUMENTS 8,990,438 B2  3/2015  Chassot et al.
2011/0128462 A1  6/2011  Lin et al.
(Continued)

OTHER PUBLICATIONS

European Patent Office, International Search Report and Written Opinion of the International Searching Authority, dated Jul. 5, 2017, 12 pages, European Patent Office, P.B. 5818 Patentlaan 2, NL-2280 HV Rijswijk.

*Primary Examiner* — Sean H Nguyen
(74) *Attorney, Agent, or Firm* — ALG Intellectual Property, LLC

(57) ABSTRACT

There is provided a hearing device to be worn by a user for stimulating the user's hearing, comprising an interface (20) for wireless communication with external devices (11, 40, 42, 44, 46, 48, 50, 54, 56), and a pairing control unit (38) for controlling pairing of the hearing device with external devices. The pairing control unit is configured to maintain a plurality of pairing tables (P1, P2), wherein each pairing table is configured to persistently store a limited number of pairing information entries for external devices paired with hearing device, and wherein, once the maximum number of external devices has been reached, one of the existing entries is overwritten when a new pairing information entry is to be stored in the paring table. The pairing control unit is further configured to decide in which one of the pairing tables a new pairing information entry is to be persistently stored, the decision being based on target pairing table selection information provided to the pairing control unit during the pairing process.

16 Claims, 3 Drawing Sheets

(52) U.S. Cl.
CPC .... *H04R 2225/025* (2013.01); *H04R 2225/55* (2013.01); *H04W 12/55* (2021.01)

(58) Field of Classification Search
USPC .......................................................... 381/315
See application file for complete search history.

(56) References Cited

U.S. PATENT DOCUMENTS

| | | |
|---|---|---|
| 2011/0319018 A1 | 12/2011 | Kroman |
| 2012/0307640 A1 | 12/2012 | Wackerly et al. |
| 2015/0043428 A1* | 2/2015 | Erdmann ................ H04L 45/54 370/328 |
| 2016/0150350 A1* | 5/2016 | Ingale .................... H04W 12/08 370/255 |
| 2017/0347183 A1* | 11/2017 | Masaki ................ H04R 1/1041 |

\* cited by examiner

WIRELESS HEARING DEVICE COMPRISING SPLIT PAIRING TABLES

The invention relates to a hearing device comprising an interface for wireless communication with external devices.

Devices communicating with each other via a wireless interface typically establish a mutual trusted relationship through the exchange of cryptographic material once they connect to each other for the first time with the cryptographic material (key material) being stored persistently on both devices in so-called pairing tables in order to facilitate the establishment of subsequent private connections. Hearing devices, such as hearing aids, having a wireless interface may connect (and consequently pair) with a plurality of external devices, such as smartphones, remote controls or servicing devices which assist configuration, repair or service of the hearing device. Hearing devices are typically small battery-powered devices which have a limited user interface and are limited in computational power and storage capacity.

A simple way of maintaining a limited pairing table is to let new pairings override existing entries once there is no space left for additional entries.

U.S. Pat. No. 8,990,438 B2 relates to a system comprising a portable computer and multiple wireless human interface devices. While typically the use of human interface devices involves that an individual wireless USB dongle has to be plugged into the portable computer for each of the human interface devices, thereby using up all available USB ports of the portable computer, U.S. Pat. No. 8,990,438 B2 proposes to overcome this problem by a single dongle which pairs with multiple human interface devices and yet stores multiple pairing entries for that unifying dangle.

U.S. Pat. No. 8,224,004 B2 relates to a hearing system comprising a hearing device and a remote control, wherein the hearing device and the remote control may automatically pair once they are closer than a predetermined distance, and wherein the remote control may recognize the type of hearing device from a look-up table so as to automatically control a hearing device application program selection.

US 2013/0095753 A1 relates to a peer-to-peer device pairing method using a Bluetooth protocol, wherein the pairing information for a certain paired device is deleted from the memory of the counterpart paired device once that device runs short of memory space, unless the pairing information is protected by request.

It is an object of the invention to provide for a wireless hearing device which is capable of handling connectivity to a plurality of external devices in a manner which does not require ample resources of the hearing device but nevertheless is user friendly. It is a further object to provide for a corresponding method of operating a wireless hearing device.

According to the invention, these objects are achieved by a hearing device as defined in claim 1 and a method as defined in claim 21, respectively.

The invention is beneficial in that, by providing a plurality of pairing tables, wherein the pairing control unit is configured to decide in which one of the pairing tables a new pairing information entry is to be persistently stored, with the decision being based on target pairing table selection information provided to the pairing control unit during the pairing process, the hearing device is enabled to prioritize a certain pairing over other pairings. For example, one of the pairing tables may be assigned to end-user initiated pairings, while another one of the pairing tables may be associated with service-provider initiated pairings, so that, for example, a new service-provider initiated pairing may be prevented from overwriting a previous end-user initiated pairing. In other words, by providing such split pairing tables, pairings associated with a certain type of user and/or device can be prevented from interfering with pairings of a different type of user and/or device.

Preferred embodiments of the invention are defined in the dependent claims.

Hereinafter, examples of the invention will be illustrated by reference to the attached drawings, wherein.

Figure 1:
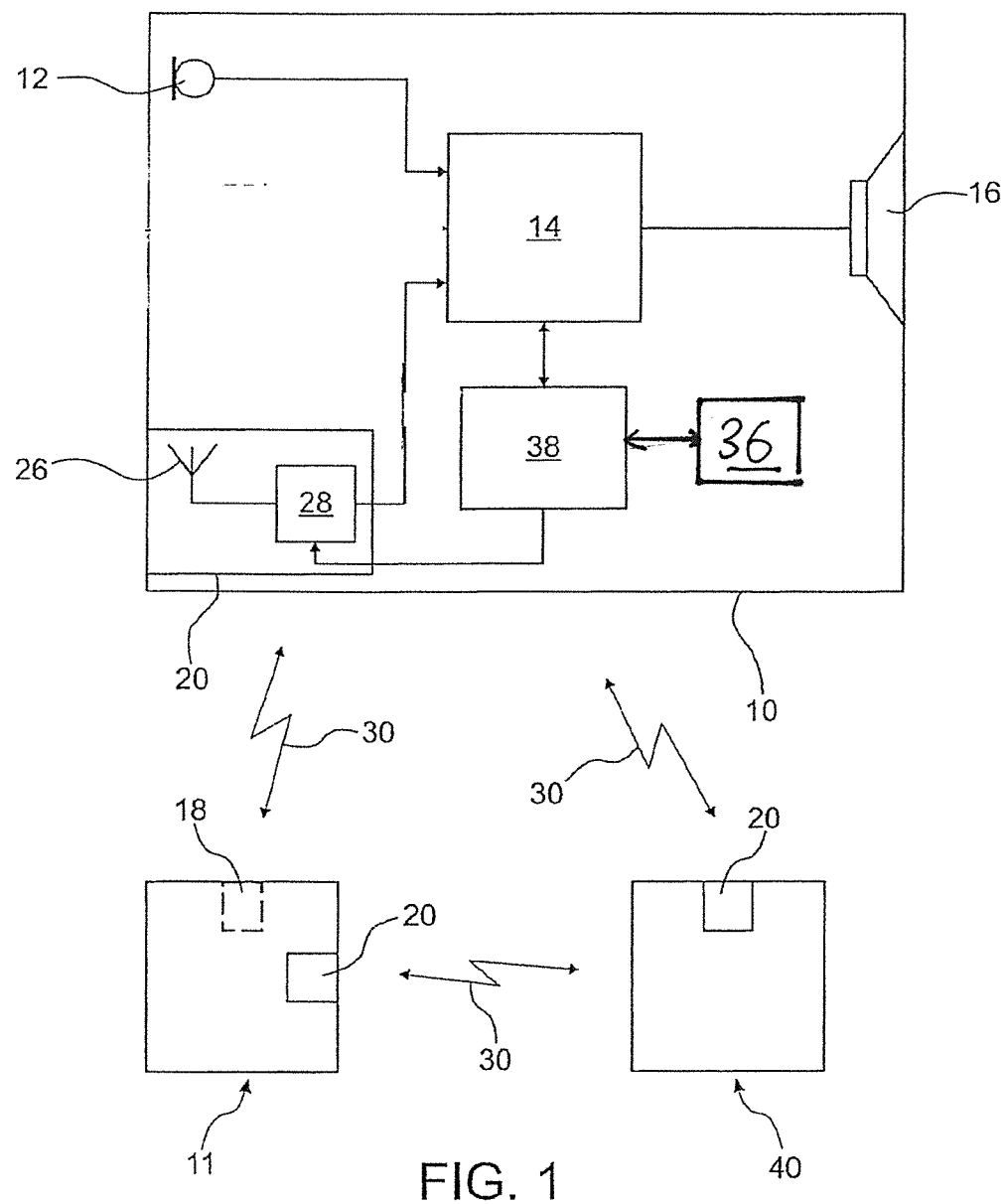
FIG. 1 is a block diagram of an example of a hearing device according to the invention when connected to two external devices.

FIG. 1 is a block diagram of an example of a first hearing device 10 to be worn at one ear of a user which typically is used together with a second hearing device 11 to be worn at the other ear of the user. The first and second hearing devices 10, 11 are ear level devices and together form a binaural hearing system. Preferably, the hearing devices 10, 11 are hearing instruments, such as RIC (Receiver in the canal), BTE (behind-the-ear), ITE (in-the-ear), ITC (in the canal) or CIC (completely-in-the-canal) hearing aids. However, the hearing devices, for example, also could be an auditory prosthesis, such as a cochlear implant device comprising an implanted cochlear stimulator and an external sound processor which may be designed as a BTE unit with a headpiece or as an integrated headpiece.

In the example of FIG. 1, the hearing devices 10, 11 are hearing aids comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals (these elements are shown in FIG. 1 only for the hearing aid 10). For example, the audio signal processing in the unit 14 may include acoustic beamforming (in this case, the microphone arrangement 12 comprises at least two spaced apart microphones).

The hearing aids 10, 11 comprise a wireless interface 20 comprising an antenna 26 and a transceiver 28. The interface 20 is provided for enabling wireless data exchange between the first hearing aid 10 and the second hearing aid 11 via a wireless link 30 which serves to realize a binaural hearing assistance system, allowing the hearing aids 10, 11 to exchange audio signals and/or control data and status data, such as the present settings of the hearing aids 10, 11.

The interface 20 is also provided for data exchange via a wireless link 30 from or to a client device 40, for example for receiving an audio data stream from an external device acting as an audio source, or data from a remote control device.

According to one example, the interface 20 may be a Bluetooth interface, preferably a Bluetooth Low Energy (BTLE) interface.

The hearing aids 10, 11 also comprise a control unit 38 for controlling operation of the hearing aids 10, 11, with the control unit 38 acting on the signal processing unit 14 and the transceiver 28, and a memory 36 for storing data required for operation of the hearing aid 10, 11 and data required for operation of the interface 20, such as pairing/ network data. In particular, the control unit 38 and the memory 36 are configured to enable to maintain at least two tables which are separate or independent from each other, as will be explained in detail below.

Figure 2:
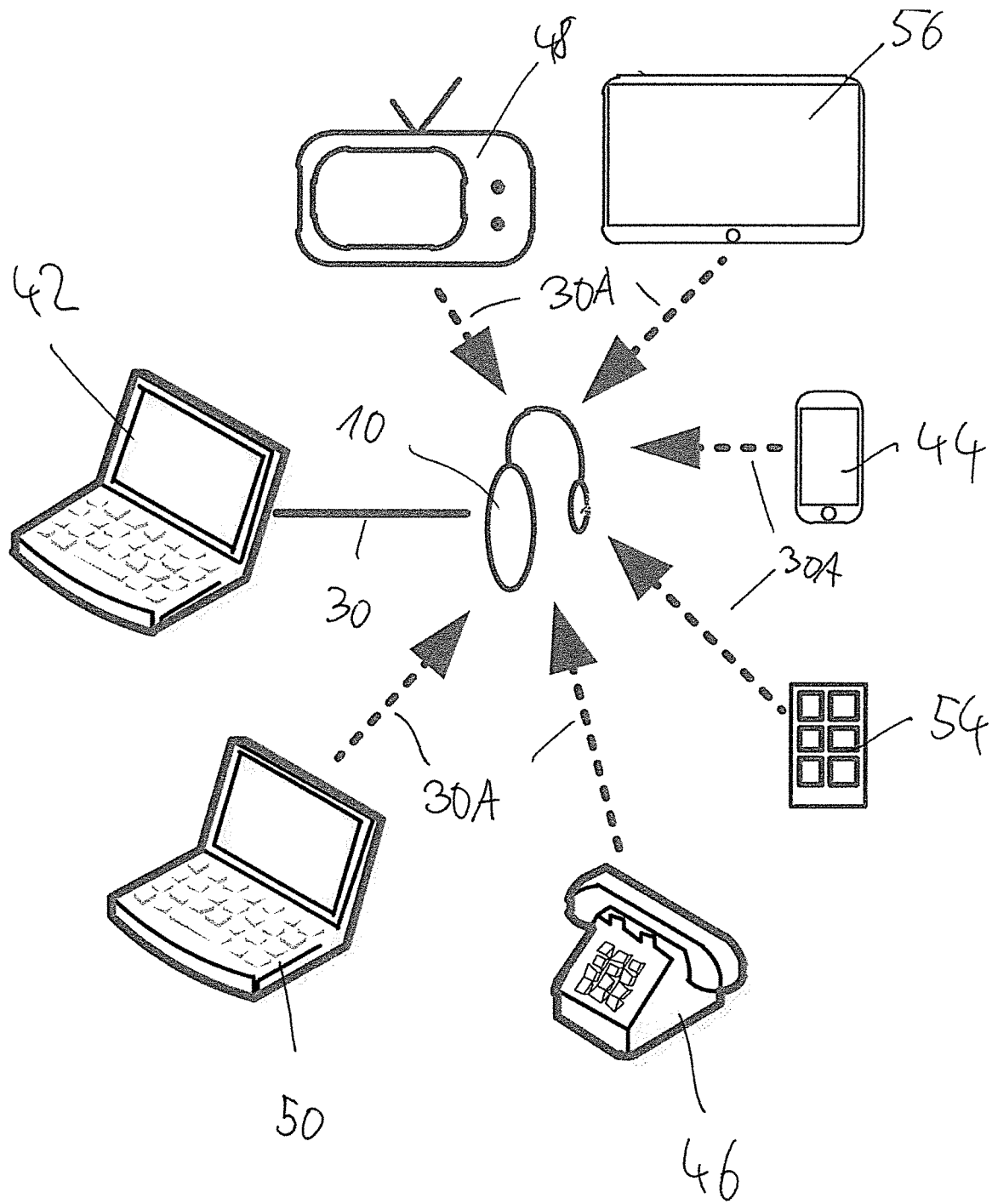
FIG. 2 is a schematic representation of an example of a hearing device when connected to a plurality of external devices.

In particular, the control unit 38 is configured to handle connectivity of the hearing device 10 via the wireless interface 20 to a plurality of external devices, like the devices shown in FIG. 2. In the example of FIG. 2, the hearing device 10 is connected via a connection 30 to a first fitting station 42 (which acts as one of the client devices), while other external devices, like a smartphone 44, a telephone device 46, a media streamer 48, a second fitting station 50, a remote control 54, and a tablet 56 may try to connect with the hearing device 10 via connections 30A (shown in dashed lines in FIG. 2). Typically, the external devices which may be connected with the hearing device comprise at least one of a contralateral hearing device, a smartphone, a remote control, an audio streaming device, a wireless microphone and a fitting station.

In hearing devices the capacity of pairing tables typically is quite limited. One limitation is caused by the memory footprint of the pairing material (i.e. the pairing keys). Another limitation is the processing involved in the need to check connections which are about to be established against every pairing table entry. This becomes particularly computation intensive when a peer uses random resolvable addresses for which resolution must be tried against the identity resolving key of every entry in the pairing table.

In general, once a pairing table is full, new pairings are either impossible or need to replace existing entries. The replacement of existing pairing entries becomes particularly inconvenient when a pairing initiated by a second user overwrites a pairing initiated by a first user, since the first user then may be annoyed when a pairing initiated by him will no longer be present due to the action of a second user. In the context of wireless hearing devices, such first user and second user may correspond to the owner of, for example, a pair of binaural hearing aids, and a service provider who is in charge of configuration or repair of the hearing aids.

Figure 3:
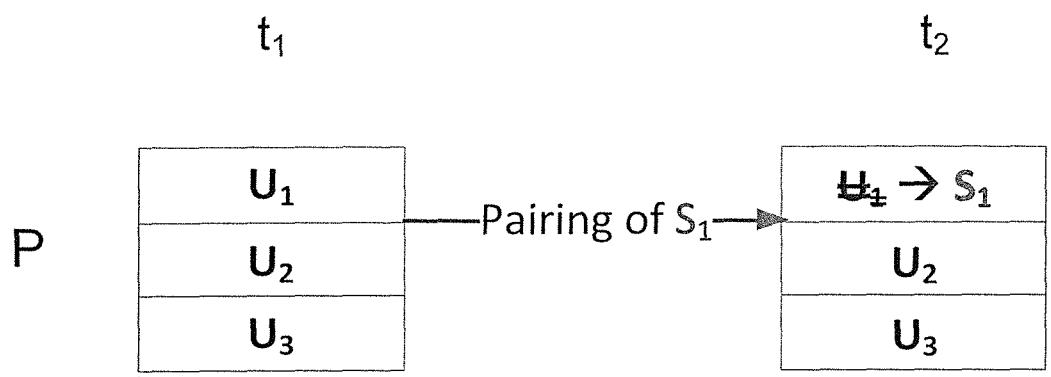
FIG. 3 is a schematic illustration of a pairing overwriting in a single pairing table.

FIG. 3 illustrates a single pairing table P having a capacity of three pairing entries, wherein the left-hand side of FIG. 3 shows that at a time $t_1$ the pairing table holds three entries for three different devices $U_1$, $U_2$ and $U_3$ as a result of pairings initiated by the owner of the hearing aid. If now a service provider initiates a pairing with a device $S_1$, one of the existing pairings will be overwritten, for example the pairing $U_1$, as illustrated at the right-hand side of FIG. 3 which shows the pairing table at the time $t_2$ of the pairing with the device $S_1$. Since the owner of the hearing aid did not initiate the pairing with the service device $S_1$, he is likely to be annoyed that his hearing aid no longer connects to the device $U_1$, such as the smartphone of the owner of the hearing aid, which now is no longer represented in the pairing table.

It is to be noted that the pairing of $U_1$ also would have been overwritten if the end user had paired a fourth device $U_4$; however, since the pairing to $U_4$ would be under the user's control and since the user would be aware of the limited capacity of the pairing table of the hearing aid, he is much more likely to accept that his pairing to $U_4$ will overwrite an existing entry, compared to the above case in which one of his pairings is overwritten by a pairing initiated by a person other than the owner of the hearing aid.

Figure 4:
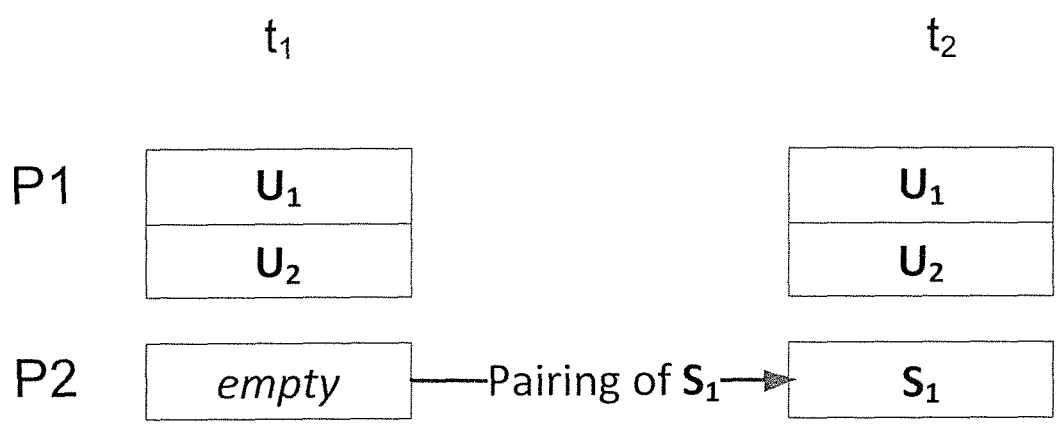
FIG. 4 is an example of a split pairing table according to the invention.

Such kind of user interference as illustrated in FIG. 3 may be overcome, at least to some extent, by replacing a single pairing table by a plurality of separate/independent pairing tables which, for example, may be assigned to different users. For example, as illustrated in FIG. 4, there may be two independent pairing tables P1 and P2, wherein the first pairing table P1 is assigned to pairings initiated by the owner of the hearing device, whereas pairing table P2 is assigned to pairings initiated by a service provider. The pairing table P1 has a capacity of two pairings and, at the time $t_1$, holds two entries for devices $U_1$ and $U_2$ representing pairings initiated by the owner of the hearing aid. Pairing table P2 has a capacity of one pairing and is empty at the time $t_1$. The total capacity of the pairing tables P1 and P2 is three, which corresponds to the capacity of the single pairing table P in FIG. 3, so that FIG. 4 actually shows a split version of the pairing table P of FIG. 3. With the split pairing tables P1 and P2 of FIG. 4 the service provider initiated pairing with the service device $S_1$ at the time $t_2$ will be written into the pairing table P2 and thus will not overwrite any owner initiated pairing $U_1$, $U_2$ (see right-hand side of FIG. 4). It is to be noted that of course one of the pairings $U_1$ and $U_2$ of the pairing table P1 will be overwritten once the owner of the hearing device initiates pairing with a third device $U_3$, since such new pairing $U_3$ will be written to the owner-assigned pairing table P1 rather than into the service provider assigned pairing table P2. However, as already mentioned above, such pairing overwriting is likely to be acceptable to the owner once he is aware of the limited capacity of the pairing tables.

It is to be noted that multiple pairing tables also may be realized through a (single) common table where entries are tagged to belong to different categories with an upper limit for the number of tagged entries per category. In other words, in such case the multiple pairing tables actually are "virtual" tables, wherein the tag of each entry of the common table designates the membership to one of the "virtual" tables.

While in the above example there are two different "categories" of pairings, namely pairings initiated by the owner (end-user) of the hearing device and pairings initiated by a service provider, pairings with the binaural counterpart of the hearing device, i.e. the pairing with the contralateral hearing device of a binaural system (cf. hearing device 11 in the example of FIG. 1), may be considered as a category on its own in the sense that the binaural pairing should not overwritten by pairings of the other two categories. Thus, there may be actually three different pairing categories, which may be implemented by three separate pairing tables.

For implementing a split pairing table concept, the hearing device has to be enabled to decide for each pairing into which of the pairing tables the present pairing is to be written. To this end, the control unit 38, which also acts as a pairing control unit, is provided with target pairing table selection information during the pairing process so as to decide, based on the target pairing table selection information received during the pairing process, into which one of the pairing tables the respective pairing is to be written.

Preferably, the target pairing selection information is provided in such a manner that each of the pairing tables is actually assigned to a certain user, such as the owner of the hearing device and a service provider. In addition, as already mentioned above, a third pairing table may be assigned to the binaural pairing.

According to one example, the hearing device receives the target pairing table selection information as a message from the respective (external) device involved in the pairing process; such message may be sent prior to sending a pairing request to the hearing device, or it may be sent after the pairing request. Sending the target pairing table selection information message prior to sending the pairing request has the advantage that, in case that the hearing device is not willing to accept pairings from devices for which it has no designated pairing table, it may reject the pairing request. Sending the message after the pairing request has the benefit that the hearing device may persistently store the pairing only once it receives the target pairing table selection information message, so that the hearing device can restrict interaction to the pairing device to a predetermined time span or up to the next erasure of volatile storage space.

According to an alternative embodiment, the hearing device may receive the target pairing table selection information not from the pairing device but rather from a third device communicating with the hearing device, such as a smartphone, wherein the third device has a user interface for receiving a corresponding user input concerning the target pairing table selection information. In other words, in this case the target pairing table selection information message is not sent from the pairing device but rather from a third device acting as a pairing manager. For example, the hearing device, when having received a pairing request, may send information concerning the pairing request to the third device on which the user then will be prompted to select the target pairing table for the pairing device.

According to a further alternative embodiment, the hearing device is configured to derive the target pairing information from device identification information, such as an address or an attribute, received from the pairing device (i.e. the external device involved in the pairing process); also in this case the pairing device does not send a target pairing table selection information message.

According to one example, the target pairing selection information may be indicative of whether the pairing device belongs to a predefined group of pairable devices, so that in this case a certain one of the pairing tables can be assigned to a certain group of devices. For example, one of the pairing tables may be assigned to services devices.

According to one example, the target pairing table selection information may be implemented as a default setting in the respective external device, it may be user configurable or it may be hard-coded. Actually, the same device may send different target pairing table selection information messages, depending on the specific application requesting pairing with the hearing device, i.e. different applications may be run on the same device, which have different target pairing tables. For example, a remote control application used in service context, for example by a hearing care professional when configuring the hearing device, may be configured to request "service-provider pairing", while the same remote control application, when used by a hearing impaired customer, will be configured to request "end-user pairing" (i.e. "owner pairing"). In principle, the application may be even configured to dynamically request the user to designate the target pairing table every time it requests a pairing. Thus, the target pairing table actually is not device-specific but rather is specific to the entity requesting pairing, such as the application presently requesting pairing.

According to one embodiment, the hearing device is configured to ignore pairing requests from pairing devices in case that the hearing device does not receive target pairing table selection information during the pairing process. According to a variant, the hearing device may be configured to not persistently store pairing information in case that the hearing device does not receive target pairing selection information during the pairing process.

According to another embodiment, one of the pairing tables may be a default pairing table, wherein the hearing device is configured to select the default pairing table for storing a new pairing information entry in case that the hearing device does not receive target pairing table selection information during the pairing process.

According to one embodiment, the hearing device may ignore pairing requests from devices in case that target pairing table selection information is received which does not correspond to one of the pairing tables of the hearing device.

According to another example, the hearing device may ignore pairing requests from devices in case that the tagging information associated with the pairing request received from the device is not recognized by the hearing device as being supported by the hearing device.

According to one embodiment, there may be only two pairing tables, wherein one of the pairing tables is associated with all pairings which are not associated with the other one of the pairing tables, i.e. one of the pairing tables can be specifically addressed by the target pairing table selection information, while the other pairing table is used for all other cases.

The invention claimed is:

1. A hearing device, comprising:
an interface for wireless communication with external devices; and
a pairing control unit for controlling pairing of the hearing device with external devices,
wherein the pairing control unit is configured to maintain a plurality of pairing tables,
wherein each pairing table is configured to store a limited number of pairing information entries for external devices paired with the hearing device,
wherein, once a maximum number of external devices has been reached, one of the existing entries is overwritten when a new pairing information entry is to be stored in the paring table, and
wherein the pairing control unit is configured to decide in which one of the pairing tables a new pairing information entry is to be stored, the decision based on target pairing table selection information provided to the pairing control unit during the pairing process, and
wherein the pairing control unit is configured to ignore pairing requests from an external device in case that the pairing control unit does not receive target pairing table selection information during the pairing process.

2. The hearing device of claim 1, wherein the pairing control unit is configured to receive the target pairing table selection information as a message from the external device.

3. The hearing device of claim 2, wherein the pairing control unit is configured to receive the target pairing table selection information message prior to a pairing request.

4. The hearing device of claim 2, wherein the pairing control unit is configured to receive the target pairing table selection information message after a pairing request.

5. The hearing device of claim 1, wherein the pairing control unit is configured to receive the target pairing table selection information as an input via a user interface of a third device communicating with the hearing device.

6. The hearing device of claim 5, wherein the hearing device is configured to send information concerning a pairing request received from an external device to the third device, and wherein the third device is configured to allow the user to enter target pairing table selection information via a user interface into the third device and send a respective target pairing table selection information message to the hearing device.

7. The hearing device of claim 1, wherein the pairing control unit is configured to derive the target pairing table information from device identification information, such as an address or an attribute, received from the external device involved in the pairing process.

8. The hearing device of claim 1, wherein the target pairing table selection information is indicative of whether the external device involved in the pairing process belongs to a predefined group of pairable devices.

9. The hearing device claim 1, wherein the pairing control unit is configured to not persistently store pairing information of a pairing process case that the pairing control unit does not receive target pairing table selection information during the pairing process.

10. The hearing device of claim 1, wherein one of the pairing tables is a default pairing table, with the pairing control unit being configured to select the default pairing table for storing a new pairing information entry in case that the pairing control unit does not receive target pairing table selection information during the pairing process.

11. The hearing device of claim 1, wherein the pairing control unit is configured to ignore pairing requests from an external device in case that the pairing control unit receives target pairing table selection information which does not correspond to one of the pairing tables.

12. The hearing device of claim 1, wherein the pairing control unit is configured to ignore pairing requests from external devices in case that the tagging information associated with the pairing request is not recognized by the pairing control unit as being supported by the hearing device.

13. The hearing device of claim 1, wherein each pairing table is realized as a virtual table in a common table, wherein each of the entries in the common table includes a tag which designates the membership of that entry to one of the virtual tables.

14. The hearing device of claim 1, wherein the hearing device is a hearing aid, an auditory prosthesis, or a cochlear device.

15. A method of operating a hearing device, the method comprising:
    establishing, by a wireless communication interface, a wireless link with an external device;
    maintaining, by a pairing control unit of the hearing device, a plurality of paring tables,
        wherein each pairing table is configured to persistently store a limited number of pairing information entries for external devices paired with hearing device, and
        wherein, once the maximum number of external devices has been reached, one of the existing entries is overwritten when a new pairing information entry is to be stored in the paring table; and
    deciding, by the pairing control unit and based on target pairing table selection information provided to the pairing control unit during the pairing process, in which one of the paring tables a new pairing information entry is to be persistently stored
    wherein the pairing control unit is configured to ignore pairing requests from an external device in case that the pairing control unit does not receive target pairing table selection information during the pairing process.

16. A non-transitory computer-readable medium storing instructions, which when executed by a hearing device, cause the hearing device to perform operations, the operations comprising:
    establishing, by a wireless communication interface, a wireless link with an external device;
    maintaining, by a pairing control unit of the hearing device, a plurality of paring tables,
        wherein each pairing table is configured to store a limited number of pairing information entries for external devices paired with the hearing device, and
        wherein, once a maximum number of external devices has been reached, one of the existing entries is overwritten when a new pairing information entry is to be stored in the paring table; and
    deciding, by the pairing control unit and based on target pairing table selection information provided to the pairing control unit during the pairing process, in which one of the paring tables a new pairing information entry is stored,
    wherein the pairing control unit is configured to ignore pairing requests from an external device in case that the pairing control unit does not receive target pairing table selection information during the pairing process.

* * * * *